United States Patent
Choi et al.

(10) Patent No.: US 12,551,320 B2
(45) Date of Patent: Feb. 17, 2026

(54) METHOD FOR SELECTING MARGIN LINE POINT, AND DENTAL CAD DEVICE THEREFOR

(71) Applicant: OSSTEM IMPLANT CO., LTD., Seoul (KR)

(72) Inventors: Kyoo Ok Choi, Seoul (KR); Sung Up Jo, Seoul (KR); Hyung Chul Kim, Seoul (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 434 days.

(21) Appl. No.: 18/018,775

(22) PCT Filed: Jul. 22, 2021

(86) PCT No.: PCT/KR2021/009482
§ 371 (c)(1),
(2) Date: Jan. 30, 2023

(87) PCT Pub. No.: WO2022/030829
PCT Pub. Date: Feb. 10, 2022

(65) Prior Publication Data
US 2023/0293274 A1    Sep. 21, 2023

(30) Foreign Application Priority Data
Aug. 6, 2020 (KR) .................. 10-2020-0098753

(51) Int. Cl.
A61C 13/00    (2006.01)
(52) U.S. Cl.
CPC .............. *A61C 13/0004* (2013.01)

(58) Field of Classification Search
CPC .................................. A61C 13/0004
See application file for complete search history.

(56) References Cited

U.S. PATENT DOCUMENTS

| 5,417,572 A | 5/1995 | Kawai et al. |
| 8,718,982 B2 | 5/2014 | Fisker et al. |
| 9,075,937 B2 | 7/2015 | Fisker et al. |
| 9,289,276 B2 | 3/2016 | Fisker et al. |
| 10,242,128 B2 | 3/2019 | Fisker et al. |

(Continued)

FOREIGN PATENT DOCUMENTS

| CN | 101686853 A | 3/2010 |
| CN | 102159155 A | 8/2011 |

(Continued)

OTHER PUBLICATIONS

Korean Office Action issued on Jun. 29, 2022 in corresponding Korean Patent Application No. 10-2020-0098753 (2 pages in Korean).

(Continued)

*Primary Examiner* — Nicholas D Lucchesi
(74) *Attorney, Agent, or Firm* — NSIP Law (57) ABSTRACT

A margin line point picking method and a dental CAD device for the same are disclosed. In a margin line point picking method according to one embodiment, while a user picks a margin line point, a preset optimum margin line point is recommended by showing a preview thereof on a screen. Accordingly, it is possible to address the inconvenience that the user has to find and pick an accurate point.

3 Claims, 7 Drawing Sheets

(56) References Cited

U.S. PATENT DOCUMENTS

| | | |
|---|---|---|
| 10,667,887 B2 | 6/2020 | Rohaly et al. |
| 2002/0037489 A1 | 3/2002 | Jones et al. |
| 2008/0261165 A1* | 10/2008 | Steingart ............... B33Y 50/00 |
| | | 433/24 |
| 2009/0248184 A1* | 10/2009 | Steingart ............... A61C 1/084 |
| | | 700/98 |
| 2010/0281370 A1* | 11/2010 | Rohaly ............... A61C 9/0053 |
| | | 715/810 |
| 2011/0050848 A1 | 3/2011 | Rohaly et al. |
| 2011/0224955 A1 | 9/2011 | Fisker et al. |
| 2013/0218531 A1* | 8/2013 | Deichmann ............ A61C 5/77 |
| | | 703/1 |
| 2014/0207422 A1 | 7/2014 | Fisker et al. |
| 2015/0265381 A1 | 9/2015 | Fisker et al. |
| 2016/0103935 A1 | 4/2016 | Fisker et al. |
| 2016/0302895 A1 | 10/2016 | Rohaly et al. |
| 2021/0059796 A1* | 3/2021 | Weiss ................... A61C 9/0053 |

FOREIGN PATENT DOCUMENTS

| | | |
|---|---|---|
| JP | 3037290 B1 | 4/2000 |
| JP | 2000-148341 A | 5/2000 |
| JP | 2012-502703 A | 2/2012 |
| KR | 10-0672325 B1 | 1/2007 |
| KR | 10-1888361 B1 | 9/2018 |
| KR | 10-1911693 B1 | 1/2019 |
| KR | 10-1994396 B1 | 6/2019 |
| KR | 10-2095531 B1 | 3/2020 |

OTHER PUBLICATIONS

Korean Office Action issued on Jan. 19, 2022 in corresponding Korean Patent Application No. 10-2020-0098753 (6 pages in Korean).
Extended European search report issued on Jul. 5, 2024, in counterpart European Patent Application No. 21853624.1 (10 pages).
Chinese Office Action Issued on Aug. 29, 2025, in Counterpart Chinese Patent Application No. 202180058013.2 (5 Pages in English, 5 Pages in Chinese).

* cited by examiner

METHOD FOR SELECTING MARGIN LINE POINT, AND DENTAL CAD DEVICE THEREFOR

CROSS REFERENCE TO RELATED APPLICATIONS

This application is a U.S. National Stage Application of International Application No. PCT/KR2021/009482, filed on Jul. 22, 2021, which claims the benefit under 35 USC 119(a) and 365(b) of Korean Patent Application No. 10-2020-0098753, filed on Aug. 6, 2020, in the Korean Intellectual Property Office, the entire disclosure of which is incorporated herein by reference for all purposes.

TECHNICAL FIELD

The present disclosure relates to a dental image processing technology, and more particularly, a technology for designing a prosthesis.

BACKGROUND ART

Dental computer-aided design (CAD) software is software for performing all tasks relating to designing objects necessary for dental treatment, such as prostheses, orthodontic materials, and dentures. Tasks such as designing a prosthesis or moving a tooth model may be performed using dental CAD software. Here, a situation in which a user has to pick a desired predetermined object among various objects on the screen using a mouse or the like in order to perform the corresponding task often occurs. However, in the process in which a user picks a specific object, great inconvenience occurs, and accuracy is poor.

DISCLOSURE

Technical Problem

One embodiment of the present disclosure proposes a margin line point picking method and a dental CAD device for the same that can address and improve inconvenience and accuracy in a point picking process that may occur when a user picks a margin line point in a margin line design process of dental CAD software.

Technical Solution

A margin line point picking method according to one embodiment includes obtaining an abutment model, into which a prosthesis model will be inserted, and displaying the obtained abutment model on a screen, generating a search area based on a position of a cursor moving due to an operation by a user on the screen on which the abutment model is displayed, and outputting a preset margin line point on the screen in a case in which the preset margin line point is positioned within the generated search area.

The margin line point picking method may further include displaying the generated search area on the screen.

The margin line point picking method may further include zooming-in or zooming-out the search area displayed on the screen.

The margin line point picking method may further include, in a case in which the user's operation moving the cursor is detected after the outputting of the margin line point, determining that the user has not picked the output margin line point and outputting a new margin line point based on a new, current position of the cursor moving on the screen.

In the generating of the search area, an area within a preset range around the current position of the cursor moving on the screen may be generated as the search area, and the preset range may be set by the user.

The preset margin line point may be in the form of a point, a vertex, or a pixel.

The preset margin line point may be a vertex with the greatest curvature among vertices of mesh data constituting the search area having a 3D form, and in the outputting of the preset margin line point on the screen, the vertex with the greatest curvature among the vertices of the mesh data constituting the search area having the 3D form may be output as a first-priority picking candidate.

In the outputting of the preset margin line point on the screen, while a preview of the margin line point is shown, the margin line point may be displayed in a distinguished manner using identifiable visual information.

A margin line point picking method according to another embodiment includes obtaining an abutment model, into which a prosthesis model will be inserted, and displaying the obtained abutment model on a screen, detecting picking of a margin line point on the abutment model due to an operation by a user on the screen on which the abutment model is displayed and generating a search area based on a position of the detected point, picking the picked margin line point as a final margin line point in a case in which the picked margin line point coincides with a preset margin line point within the search area, and generating a margin line including the picked final margin line point.

The margin line point picking method may further include displaying the generated search area on the screen.

The margin line point picking method may further include, in a case in which the preset margin line point and the margin line point picked by the user are different from each other and an error occurs, displaying an error occurrence area including the margin line point causing the error in a distinguished manner using identifiable visual information or providing a warning message that informs of the occurrence of the error.

The margin line point picking method may further include displaying an error gap between the preset margin line point and the margin line point picked by the user in a distinguished manner using identifiable visual information or displaying the error gap as numerical information.

A dental CAD device according to another embodiment includes a data obtainer configured to obtain an abutment model into which a prosthesis model will be inserted, an output device configured to display the obtained abutment model on a screen, and a controller configured to generate a search area based on a position of a cursor moving due to an operation by a user on the screen on which the abutment model is displayed and output a preset margin line point on the screen through the output device in a case in which the preset margin line point is positioned within the generated search area.

The preset margin line point may be a vertex with the greatest curvature among vertices of mesh data constituting the search area having a 3D form, and the controller may output the vertex with the greatest curvature among the vertices of the mesh data constituting the search area having the 3D form as a first-priority picking candidate.

The controller may detect picking of a margin line point on the abutment model due to an operation by a user on the screen on which the abutment model is displayed, generate a search area based on a position of the detected point, pick the picked margin line point as a final margin line point in a case in which the picked margin line point coincides with a preset margin line point within the search area, and generate a margin line including the picked final margin line point.

Advantageous Effects

According to a margin line point picking method and a dental CAD device for the same according to one embodiment, in a case in which a user has to pick a point (e.g., a point, a vertex, a pixel, or the like) for designing a margin line in dental CAD software, it is not necessary for the user to move a cursor moving on the screen to an accurate position of a point on a margin line in order to pick the point.

For example, when a user moves a cursor on the screen, an optimum margin line point included in a search area based on the position of the cursor (for example, a vertex with the greatest curvature among points on an abutment model) may be automatically searched internally by the software, and then the found optimum margin line point may be recommended by a preview thereof shown on the screen. Accordingly, without the need to additionally move the cursor to find an accurate margin line point, the user may check the optimum margin line point currently recommended and shown on the screen, pick the accurate margin line point just by a user operation (for example, a picking operation performed by clicking with a mouse) at the current position of the cursor, and perform a subsequent task. This method has the following two advantages.

First, regardless of the size of the abutment model displayed on the screen, the user can easily pick the accurate margin line point based on the current position of the cursor moving on the screen. Here, the number of times a zoom-in of the screen, a camera direction setting task, or the like is performed is reduced.

Second, when picking conditions that satisfy certain features and criteria for a margin line (e.g., a point with the maximum curvature) are preset, the software may mathematically perform accurate analysis within a search area based on the current position of the cursor moving on the screen, automatically search for the optimum margin line point, and then recommend the found optimum margin line point by showing a preview thereof to the user. Accordingly, effects of improving accuracy and precision of picking can be obtained.

MODES OF THE INVENTION

Advantages and features of the present disclosure and methods of achieving the same should become clear from embodiments described in detail below with reference to the accompanying drawings. However, the present disclosure is not limited to the embodiments disclosed below and may be implemented in various different forms. The embodiments herein only make the disclosure of the present disclosure complete and are provided to completely inform those of ordinary skill in the art to which the present disclosure pertains of the scope of the disclosure. The present disclosure is set only by the scope of the claims. Like components are denoted by like reference numerals throughout the specification.

In describing the embodiments of the present disclosure, when detailed description of a known function or component is determined as having the possibility of unnecessarily obscuring the gist of the present disclosure, the detailed description will be omitted, and the terms used herein are terms set in consideration of functions in the embodiments of the present disclosure and may vary according to an intention or practice of a user or an operator. Therefore, the terms should be set on the basis of the content throughout the specification.

Hereinafter, embodiments of the present disclosure will be described in detail with reference to the accompanying drawings. However, the embodiments of the present disclosure which will be described below may be modified in several different forms, and the scope of the present disclosure is not limited to the embodiments to be described below. The embodiments of the present disclosure are provided to fully explain the present disclosure to those of ordinary skill in the art to which the disclosure pertains.

Figure 1:
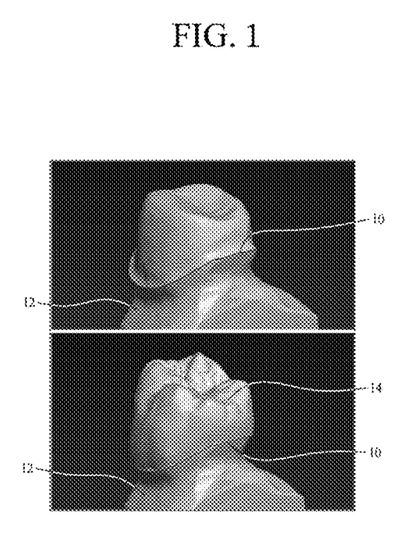
FIG. 1 is a view illustrating screens for defining a margin line according to one embodiment of the present disclosure.

FIG. 1 is a view illustrating screens for defining a margin line according to one embodiment of the present disclosure.

Referring to FIG. 1, in dental CAD software, a margin line 10 is defined as an edge boundary line where a tooth and a prosthesis come in contact with each other in a process in which a part where a cavity or caries is present is removed from a patient's tooth and then the part is replaced with a prosthesis. The margin line 10 generally has a characteristic that the curvature of a surface is remarkably greater as compared to other parts around the margin line 10. Examples of a prosthesis model 14 include a crown, an inlay, an onlay, a coping, and the like. For insertion of a prosthesis, the software obtains an abutment model 12 into which the prosthesis model 14 will be inserted and designs the margin line 10 for the obtained abutment model 12. FIG. 1 illustrates a crown as an example of the prosthesis model 14. The abutment model is a model obtained by scanning a tooth from which a cavity part is removed. The abutment model may be model data scanned in 3D within a 2D screen.

Figure 2:
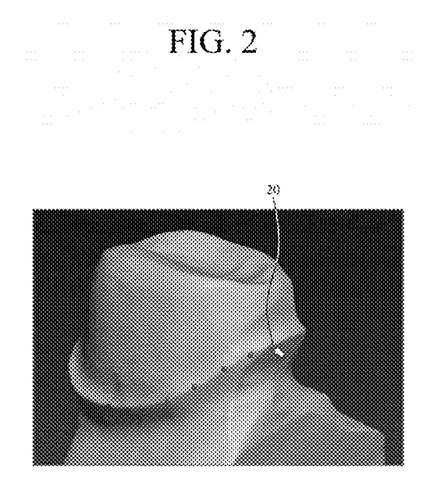
FIG. 2 is a view illustrating a screen in which a point for generating a margin line is mouse-clicked and picked by a user.

FIG. 2 is a view illustrating a screen in which a point for generating a margin line is mouse-clicked and picked by a user.

Referring to FIG. 2, according to a typical method of generating and modifying a margin line in dental CAD software, in order to generate a margin line, a user examines an abutment model on the screen and then moves a mouse cursor to a predetermined point 20, such as a point with the greatest curvature, to pick the point by mouse-clicking the point.

The above-described method may be summed up as the following sequential continuous tasks.
1. An abutment model obtained by scanning an abutment (a tooth from which a cavity part is removed) is received as an input.
2. A user checks, by visual inspection, a part to be defined as a margin line on the abutment model. Here, the user may adjust a camera view direction or the size of the model within the screen as necessary.
3. The user moves a mouse cursor to the checked margin line area on the abutment model.
4. At the position to which the mouse cursor is moved, the user mouse-clicks and picks a point for generating a margin line and checks a picking result output on the screen.
5. In a case in which the picking result for a margin line is unsatisfactory, the user returns to step 2 and repeats the above tasks.

The above-described margin line point picking method has a problem in terms of accuracy. For example, it is highly likely to obtain an inaccurate result when a user directly finds and mouse-clicks a point corresponding to a margin line while looking at an abutment model on the screen. Here, results may vary according to users, and even for the same user, there is a problem that it is not possible to always obtain the same result for the same input data. Also, the process itself in which the user directly checks and determines, by visual inspection, an "area with the greatest curvature" that corresponds to a margin line and then moves a mouse cursor to an accurate position and mouse-clicks at the position may cause inconvenience to the user.

In order to address the above-mentioned problems, the present disclosure proposes a method that allows a user to easily pick a margin line point using a mouse in a process of generating a margin line of an abutment model into which a prosthesis model will be inserted. According to the method, it is not necessary for the user to pick a margin line point present on the abutment model at an accurate position. For example, in the proposed method, when a user moves a cursor on the screen in order to pick a point that corresponds to a margin line, a preset optimum margin line point among points present in a search area based on the position of the cursor is searched through internal analysis by the software, a preview of the found optimum margin line point is shown as a picking candidate on the screen to the user, and just by the user mouse-clicking at the current position of the cursor on the screen without moving the mouse further, the optimum margin line point is picked as a final margin line point. By using the method, the user can perform tasks of generating and editing a margin line more easily, promptly, and efficiently as compared to when using the conventional method. A vertex which is the closest to the mouse cursor may be an example of a vertex that maximally satisfies margin line conditions, but the margin line conditions are not limited thereto and may be set by the user.

Figure 3:
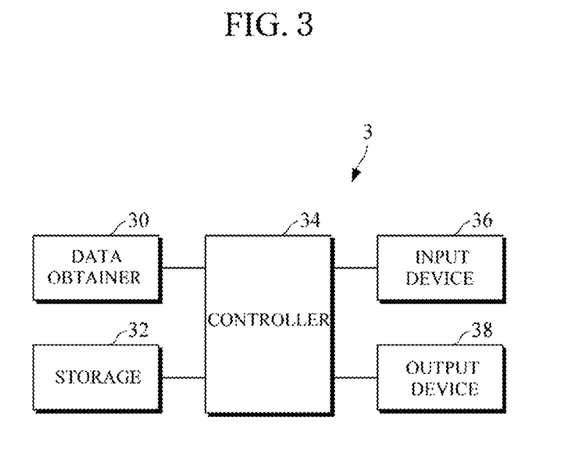
FIG. 3 is a view illustrating a configuration of a dental CAD device according to one embodiment of the present disclosure.

FIG. 3 is a view illustrating a configuration of a dental CAD device according to one embodiment of the present disclosure.

Referring to FIG. 3, a dental CAD device 3 performs a CAD process to facilitate dental prosthetics in actual dentistry. A prosthetic CAD process refers to a series of processes in which dental data of a patient is obtained, a virtual prosthesis model is loaded from a library through control by a computer program, and then the loaded virtual prosthesis model is virtually placed at a target position of the dental data. The dental data is data containing 2D information and 3D information of teeth including a damaged target tooth. The target position is the position of a target tooth.

The dental CAD device 3 is an electronic device that can run software such as prosthesis design software. Examples of the electronic device include a personal computer (PC), a laptop, a tablet, a smartphone, a mobile phone, and the like. In addition to prosthesis design software, examples of the software include a guide program, a scan program, a medical image processing program, and the like. Also, the software may be applied as typical medical software other than software for dental prosthetic surgery.

Referring to FIG. 3, the dental CAD device 3 according to one embodiment includes a data obtainer 30, a storage 32, a controller 34, an input device 36, and an output device 38.

The data obtainer 30 obtains image data from a patient. Examples of image data required for prosthetic surgery include computed tomography (CT) data, oral model data, and the like. The data obtainer 30 may execute CT data and oral model data in software or load data stored on a web page or a server.

The oral model data is data containing information on actual teeth including a damaged tooth. The oral model data may be obtained by scanning a plaster model created by imitating the patient's oral cavity with a 3D scanner. As another example, the oral model data may be obtained by scanning the inside of the patient's oral cavity using a 3D intra-oral scanner. The obtained oral model data may be stored in the storage 32.

Various pieces of data such as information necessary for the operation of the dental CAD device 3 and information generated according to the operation are stored in the storage 32. The storage 32 according to one embodiment may store oral model data and CT data of individual patients and, during a simulation of dental treatment, provide oral model data and CT data of a specific patient, among all the pieces of oral model data and CT data, to the controller 34 according to a user's request. Here, the storage 32 may store maxillary teeth arrangement images and mandibular teeth arrangement images of individual patients and may provide a maxillary teeth arrangement image and a mandibular teeth arrangement image that match the oral model data and CT data of the specific patient to the controller 34 according to a user's request. Also, the storage 32 may have a prosthetic library consisting of a plurality of prosthesis models and may provide the plurality of prosthesis models to the controller 34.

The controller 34 establishes a prosthetic surgery plan and controls each element through control by computer software. The controller 34 manages screen information shown on the screen through the output device 38, designs a virtual prosthesis to be placed in a dental image, and performs a simulation of placing the virtual prosthesis. The dental image in which the virtual prosthesis is placed refers to a multi-dimensional image such as a 2D image or a 3D image that shows teeth arrangement of a patient that is generated to establish a prosthetic surgery plan. Various types of images such as an X-ray image, a CT image, a panoramic image, a scan image, an image generated through reconstruction, and an image obtained by matching a plurality of images may be utilized in the prosthetic surgery plan.

During the prosthesis placement simulation, the controller 34 according to one embodiment generates a margin line for inserting the prosthesis into an abutment model. When points constituting the margin line are picked by a user, the controller 34 may connect the picked points to design the margin line. Here, the controller 34 proposes a method that allows the user to easily and accurately pick the points necessary to design the margin line.

The output device 38 displays the abutment model into which the prosthesis will be inserted on the screen. The abutment model is model data obtained by scanning a tooth from which a cavity part is removed. The abutment model may be an abutment model scanned in 3D within a 2D screen. A tooth model may be used instead of the abutment model.

When the user moves a cursor to the margin line on the abutment model displayed through the output device 38, the controller 34 detects the position of the cursor moving due to the operation by the user through the input device 36 and generates a search area based on the detected position of the cursor on the screen. Also, through internal analysis, the controller 34 searches for a preset optimum margin line point within the generated search area. Here, the output device 38 recommends the optimum margin line point, found by the controller 34, as a picking candidate to the user by showing a preview thereof on the screen. Here, when the optimum margin line point is a margin line point desired by the user, without the need to additionally move the mouse to an accurate position, the user may pick an accurate margin line point without further moving the cursor, through a picking operation performed by clicking with the mouse at the current position of the cursor on the screen. By using this method, the user may perform tasks of generating and editing a margin line more easily, promptly, and efficiently as compared to when using the conventional method.

As another example, when the user picks (e.g., mouse-clicks) a margin line point through the input device 36 on the abutment model displayed through the output device 38, the controller 34 detects picking of the margin line point on the abutment model and generates a search area based on the position of the detected point. Then, the controller 34 determines whether the picked margin line point coincides with or is different from a preset optimum margin line point within the search area. Here, when the picked margin line point is determined as coinciding with the preset optimum margin line point, the controller 34 picks the picked margin line point as a final margin line point and generates a margin line including the picked final margin line point.

In a case in which the picked margin line point is determined as being different from the preset optimum margin line point, the controller 34 determines that an error has occurred. For example, an error gap between the two points (the picked margin line point and the preset optimum margin line point) may be preset, and in a case in which a gap between the two points exceeds the preset error gap, it may be determined that the two points are different from each other and an error has occurred.

In the case in which an error has occurred, the controller 34 may, through the output device 38, display an error occurrence area including a margin line point causing the error in a distinguished manner using identifiable visual information or display or output a warning message that informs of the occurrence of the error.

In the case in which an error has occurred, the controller 34 may, through the output device 38, display an error gap between the preset optimum margin line point and the margin line point picked by the user in a distinguished manner using identifiable visual information or display the error gap as numerical information. Accordingly, the user may compare differences between the two points.

The input device 36 receives a user operation signal. For example, the input device 36 may receive a user operation signal for picking a margin line point on the screen. Also, the input device 36 may receive a user operation signal for moving the position of the cursor moving on the screen. A user operation signal may be received by a user operation through a pointing device, and the pointing device may be any input device such as a mouse, a keyboard, a pen, or a touchscreen. Examples of the user operation include an operation in which the user moves the cursor on the screen using the mouse, an operation in which the user picks a predetermined margin line point on a touchscreen-type screen using a pen or through a touch, and the like.

Figure 4:
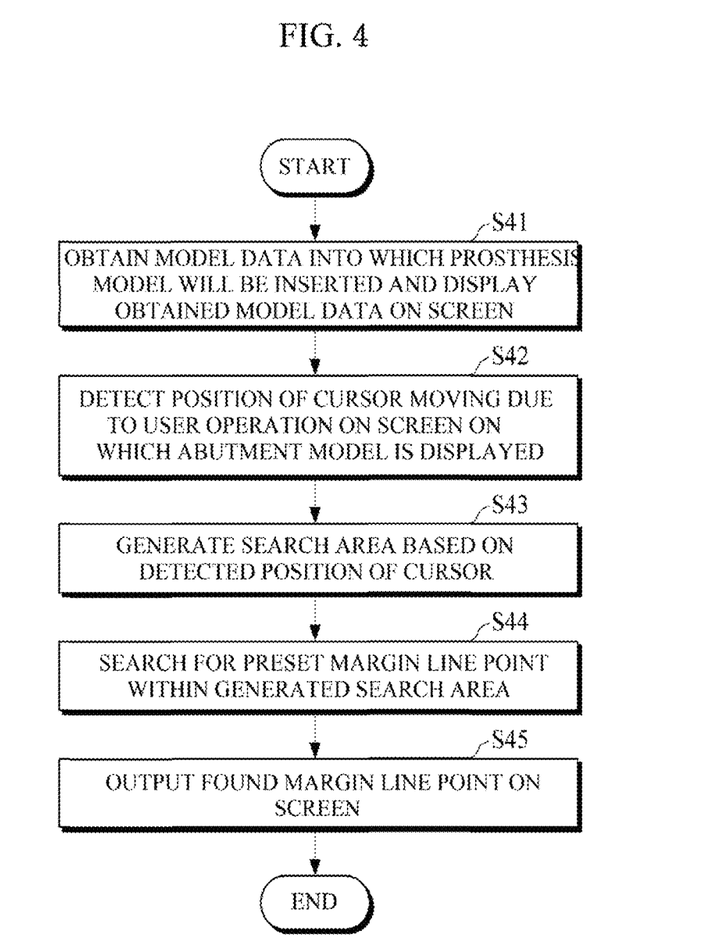
FIG. 4 is a view illustrating a flowchart of a margin line point picking method according to one embodiment of the present disclosure.

FIG. 4 is a view illustrating a flowchart of a margin line point picking method according to one embodiment of the present disclosure.

Referring to FIGS. 3 and 4, the dental CAD device 3 obtains an abutment model into which a prosthesis model will be inserted and displays the obtained abutment model on a screen (S41). The abutment model may be model data obtained by 3D scanning of an abutment (a tooth from which a cavity part is removed).

Then, the dental CAD device 3 detects a position of a cursor moving due to a user operation on the screen on which the abutment model is displayed (S42).

Then, the dental CAD device 3 generates a search area based on the detected position of the cursor (S43). The search area is an area formed within a preset distance with the current position of the cursor, moving on the screen, as a central point, and a search range from which a vertex, a point, a pixel, or the like corresponding to a margin line will be searched may be predefined. Here, the generated search area may be displayed on the screen. Further, the search area may be zoomed in or zoomed out.

Then, the dental CAD device 3 searches for a preset optimum margin line point within the generated search area (S44). The preset optimum margin line point may be a vertex with the greatest curvature among vertices of mesh data constituting the search area having a 3D form. As another example, the preset optimum margin line point may be a point which is the closest to the margin line among points on the abutment model that are present within the search area.

Then, the dental CAD device 3 outputs a preview of the found optimum margin line point on the screen (S45) to recommend the margin line point. The user checks, by visual inspection, a part determined as the margin line on the abutment model and then performs an operation of moving the cursor, moving on the screen, to the checked margin line part, and before the cursor moving on the screen moves to the margin line part checked by the visual inspection, in the outputting of the optimum margin line point (S45), the dental CAD device 3 outputs the optimum margin line point within the search area as a picking candidate on the screen by showing the preview thereof. Here, in a case in which the picking candidate shown on the screen is a margin line point desired by the user, without the need to further move the mouse to the corresponding margin line point, the user picks the margin line point through a picking operation (e.g., a mouse-clicking operation) at the current position of the cursor on the screen and checks a picking result output on the screen. On the other hand, in a case in which the picking candidate shown on the screen is unsatisfactory, the user continues to move the mouse to a desired margin line part, and the dental CAD device 3 repeats a process of searching for a new margin line point based on a new, current position of the cursor moving on the screen due to a user operation through the input device 36 and showing a preview of the found new margin line point as a picking candidate on the screen.

In the outputting of the optimum margin line point (S45), when outputting the preview of the optimum margin line point, the dental CAD device 3 may display the optimum margin line point in a distinguished manner using identifiable visual information. To this end, a function or a user interface (UI) that, when the preset optimum margin line point is searched within the search area, allows a search result to be output as a preview on the screen and checked by the user may be provided. Here, an example of a method of displaying the optimum margin line point in a distinguished manner using identifiable visual information includes a method in which the optimum margin line point is displayed by changing at least one physical feature thereof among color, shape, size, area, thickness, and highlight.

Figure 5:
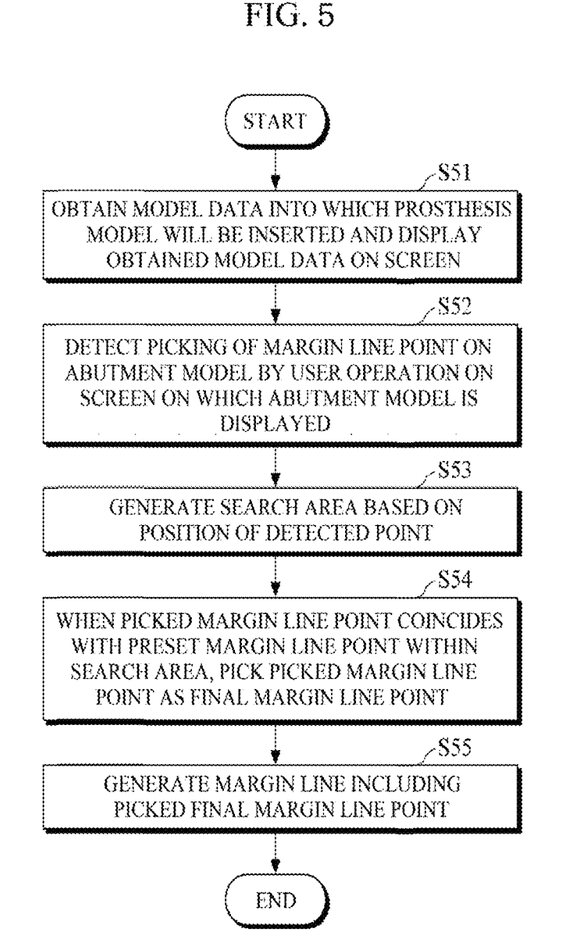
FIG. 5 is a view illustrating a flowchart of a margin line point picking method according to another embodiment of the present disclosure.

FIG. 5 is a view illustrating a flowchart of a margin line point picking method according to another embodiment of the present disclosure.

In the margin line point picking method described above with reference to FIG. 4, while the user moves the mouse to pick a margin line point on the abutment model, the dental CAD device 3 searches for an optimum margin line point and recommends the found optimum margin line point to the user by showing a preview thereof. On the other hand, in the margin line point picking method described with reference to FIG. 5, when the user picks a margin line point on an abutment model and the picked margin line point coincides with a preset optimum margin line point, the user picks the picked margin line point as a final margin line point. Here, in a case in which an error occurs (for example, the picked margin line point is not the optimum margin line point), the dental CAD device 3 may correct the corresponding error and display the optimum margin line point as a candidate point.

More specifically, referring to FIGS. 3 and 5, the dental CAD device 3 obtains an abutment model into which a prosthesis model will be inserted and displays the obtained abutment model on a screen (S51).

Then, the dental CAD device 3 detects picking of a margin line point on the abutment model by a user operation on the screen on which the abutment model is displayed (S52). Here, the user operation corresponds to an operation in which the user picks a point determined as a margin line by mouse-clicking or the like on the abutment model displayed on the screen.

Then, the dental CAD device 3 generates a search area based on a position of the detected point (S53). Here, the dental CAD device 3 may display the generated search area on the screen. Further, the dental CAD device 3 may zoom-in or zoom-out the search area.

Then, when the picked margin line point coincides with a preset optimum margin line point within the search area, the dental CAD device 3 picks the picked margin line point as a final margin line point (S54). Also, the dental CAD device 3 generates a margin line including the picked final margin line point (S55).

On the other hand, in a case in which the margin line point picked by the user and the preset optimum margin line point are different from each other, the dental CAD device 3 may determine that an error has occurred. Here, the dental CAD device 3 may display an error occurrence area including a margin line point causing the error in a distinguished manner using identifiable visual information or display or output a warning message that informs of the occurrence of the error.

Further, in the case in which an error has occurred, the dental CAD device 3 may display an error gap between the margin line point picked by the user and the preset optimum margin line point in a distinguished manner using identifiable visual information or display the error gap as numerical information. Accordingly, the user may compare differences between the two points.

Figure 6:
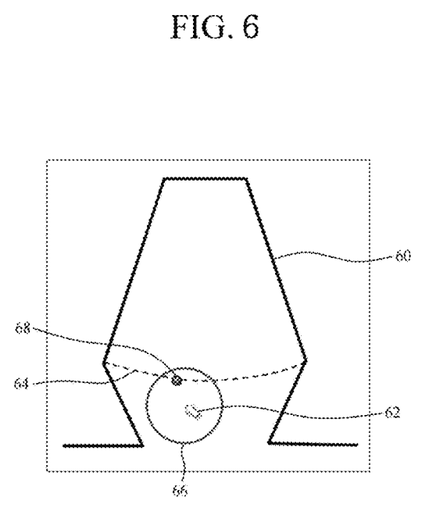
FIG. 6 is a view illustrating a screen that shows an example in which a margin line point is easily and accurately picked using the margin line point picking method according to one embodiment of the present disclosure.

FIG. 6 is a view illustrating a screen that shows an example in which a margin line point is easily and accurately picked using the margin line point picking method according to one embodiment of the present disclosure.

Referring to FIGS. 3 and 6, the dental CAD device 3 detects the current position of a cursor 62 moving on a screen according to a user operation moving a mouse to a point determined as a margin line on an abutment model 60 displayed on the screen.

Then, the dental CAD device 3 generates a search area 66 based on the detected current position of the cursor 62. The search area 66 for picking a margin line point may be defined in various forms using various methods as necessary. For example, the dental CAD device 3 may generate an area within a preset range around the current position of the cursor 62 displayed on the abutment model 60 as the search area 66. In FIG. 6, a circle or sphere having a certain radius around the current position of the cursor 62 on the abutment model 60 is defined as the search area 66. Here, the dental CAD device 3 may zoom-in or zoom-out a preset range of the search area 66 that is set by the user. Also, the dental CAD device 3 may display the search area 66 on the screen and may zoom-in or zoom-out the displayed search area 66. For example, in a case in which a margin line image on the abutment model is unclear and is difficult to clearly distinguish, the dental CAD device 3 may zoom-out the search area 66 to improve accuracy.

The dental CAD device 3 recommends a margin line point by showing a preview of a preset optimum margin line point 68 within the generated search area 66 on the screen. The optimum margin line point 68 is a point having features of a point which is the most suitable for conditions of a margin line among points on the abutment model that are included within the search area 66. For example, as illustrated in FIG. 6, the dental CAD device 3 recommends a vertex with the greatest curvature, among vertices of mesh data constituting the search area 66 having a 3D form, as the optimum margin line point 68. Model data, for example, a scan model, may consist of triangle mesh data, and each point of mesh data is referred to as a vertex.

The dental CAD device 3 may, according to the user's operation picking the recommended optimum margin line point 68 at the current position of the cursor 62 moving on the screen, pick the recommended optimum margin line point 68 as a final margin line point without further movement of the mouse and may connect final margin line points picked in this way to generate a margin line 64.

When outputting the optimum margin line point 68 in the form of a preview, the dental CAD device 3 may display the optimum margin line point 68 in a distinguished manner using identifiable visual information. For example, the dental CAD device 3 may apply an appropriate method such as showing the optimum margin line point 68 with a changed color or an increased size. FIG. 6 illustrates, as an example, a method in which the optimum margin line point 68 found within the search area 66 is displayed using a circular or spherical object.

Figure 7:
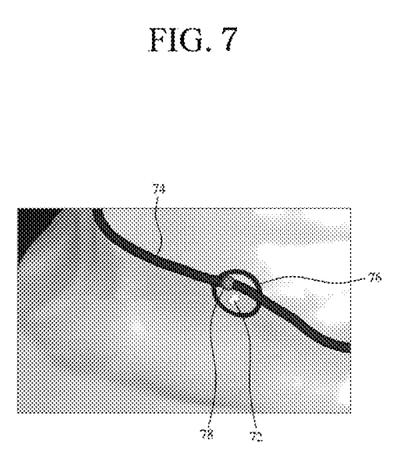
FIG. 7 is a view illustrating a screen that shows an example in which a margin line point is easily and accurately picked using the margin line point picking method according to another embodiment of the present disclosure.

FIG. 7 is a view illustrating a screen that shows an example in which a margin line point is easily and accurately picked using the margin line point picking method according to another embodiment of the present disclosure.

Referring to FIGS. 3 and 7, the user checks, by visual inspection, a part determined as a margin line on an abutment model and then moves a cursor to the checked margin line part, and before the cursor moves to the margin line part checked by the visual inspection, the dental CAD device 3 generates a search area 76 based on the current position of a cursor 72 and outputs a preset optimum margin line point 78 within the search area 76 as a picking candidate on the screen by showing a preview thereof to recommend the margin line point. Here, the dental CAD device 3 may display the search area 76 on the screen.

In a case in which the optimum margin line point 78 shown on the screen is a margin line point desired by the user, without the need to further move the cursor to the optimum margin line point 78, the user may pick the optimum margin line point 78 through a picking operation (e.g., a mouse-clicking operation) at the current position of the cursor and may check a picking result output on the screen. The dental CAD device 3 may connect final margin line points picked in this way to generate a margin line 74.

When outputting the optimum margin line point 78, the dental CAD device 3 may display the optimum margin line point 78 in a distinguished manner using identifiable visual information. For example, the dental CAD device 3 may apply an appropriate method such as showing the optimum margin line point 78 with a changed color or an increased size. FIG. 7 illustrates, as an example, a method in which the optimum margin line point 78 found within the search area 76 is displayed using a circular or spherical object.

The present disclosure has been described above with respect to embodiments thereof. It will be understood by those of ordinary skill in the art that the present disclosure may be embodied in many different forms without departing from essential features of the present disclosure. Therefore, the embodiments set forth herein should be considered in a descriptive sense only and not for purposes of limitation. The scope of the present disclosure is set forth in the claims rather than in the foregoing description, and all differences falling within a scope equivalent thereto should be construed as being included in the present disclosure.

The invention claimed is:

1. A margin line point picking method using a dental computer-aided design (CAD) device, the margin line point picking method comprising, by the dental CAD device:
   obtaining an abutment model, into which a prosthesis model will be inserted, and displaying the obtained abutment model on a screen;
   detecting picking of a margin line point on the abutment model due to an operation by a user on the screen on which the abutment model is displayed and generating a search area based on a position of the detected point;
   picking the picked margin line point as a final margin line point in a case in which the picked margin line point coincides with a preset margin line point within the search area;
   generating a margin line including the picked final margin line point; and
   in a case in which the preset margin line point and the margin line point picked by the user are different from each other and an error occurs, displaying an error occurrence area including the margin line point causing the error in a distinguished manner using identifiable visual information or providing a warning message that informs of the occurrence of the error.

2. The margin line point picking method of claim 1, further comprising displaying the generated search area on the screen.

3. The margin line point picking method of claim 1, further comprising, in a case in which an error has occurred, displaying an error gap between the preset margin line point and the margin line point picked by the user in a distinguished manner using identifiable visual information or displaying the error gap as numerical information.

* * * * *